United States Patent [19]

Svensson

[11] Patent Number: 4,773,697
[45] Date of Patent: Sep. 27, 1988

[54] SUN VISOR FOR THE SIDE WINDOWS OF AUTOMOTIVE VEHICLES

[75] Inventor: E. Gunnar Svensson, Malung, Sweden

[73] Assignee: Autopart Sweden AB, Malung, Sweden

[21] Appl. No.: 40,159

[22] Filed: Apr. 20, 1987

[30] Foreign Application Priority Data

May 22, 1986 [SE] Sweden ............................... 8602333

[51] Int. Cl.$^4$ ............................................. B60J 3/02
[52] U.S. Cl. ................................... 296/152; 296/146; 160/37; 49/63
[58] Field of Search ...................... 296/146, 152, 97 R, 296/97 G; 49/63; 160/37, 189

[56] References Cited

U.S. PATENT DOCUMENTS

| 1,801,115 | 4/1931 | Semisch | 49/63 |
| 1,973,166 | 9/1934 | Fowler et al. | 160/189 |
| 1,986,700 | 1/1935 | Zimmerman | 49/63 |
| 4,331,359 | 5/1982 | Sheldon | 296/146 |

FOREIGN PATENT DOCUMENTS 3222861  12/1983  Fed. Rep. of Germany .

Primary Examiner—Robert R. Song
Attorney, Agent, or Firm—Young & Thompson

[57] ABSTRACT

The invention relates to a sun visor, or glare shield, for vehicle side windows. The sun visor comprises a sheet-like member which is journalled for vertical movement in guides provided in the side of the vehicle. The sheet-like member can be adjusted to any selected position between a lowered position, in which the member is fully hidden within the side of the vehicle, and a raised position in which it covers only an upper part of the side window and exposes a lowered part of the window.

5 Claims, 4 Drawing Sheets

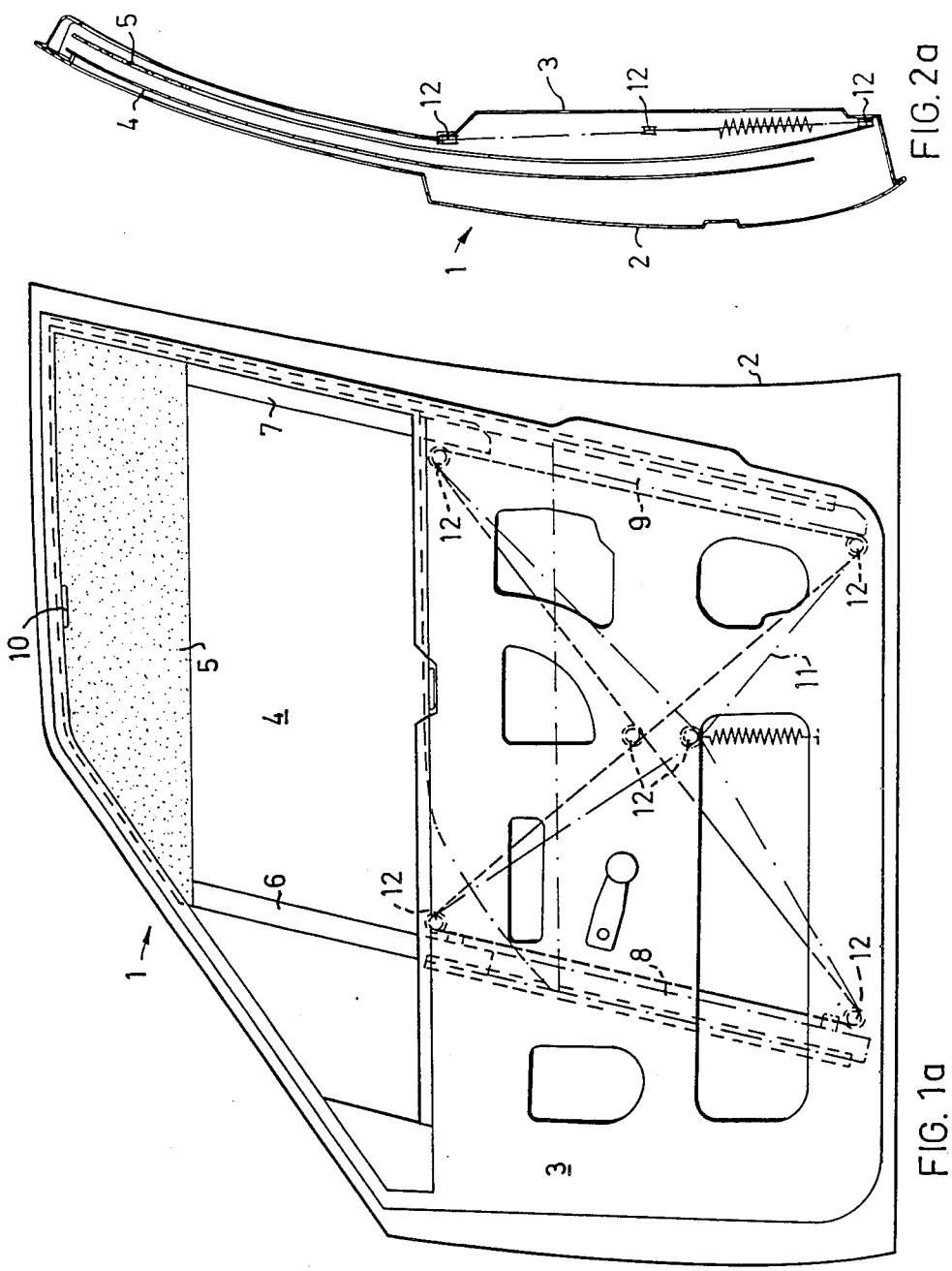

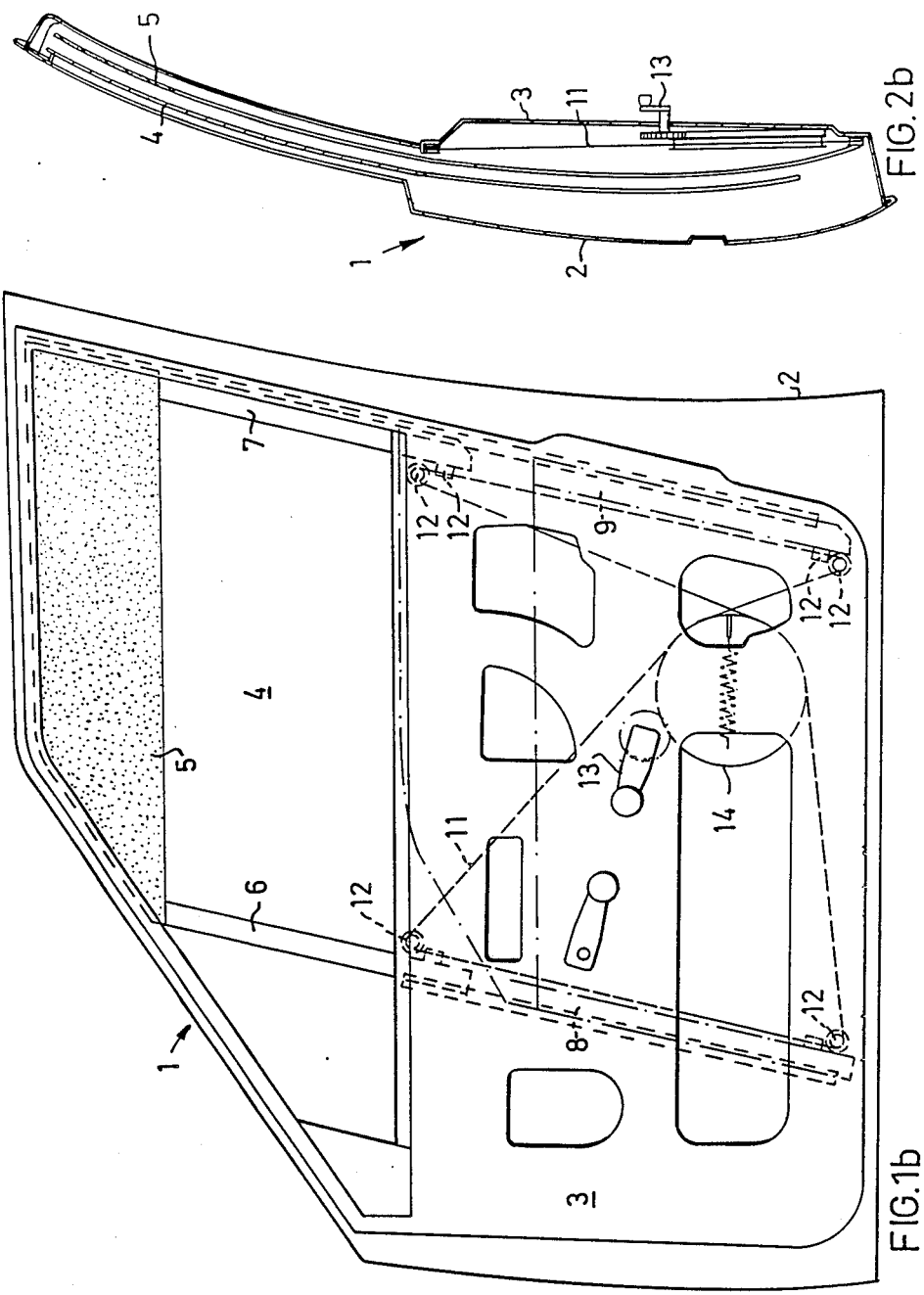

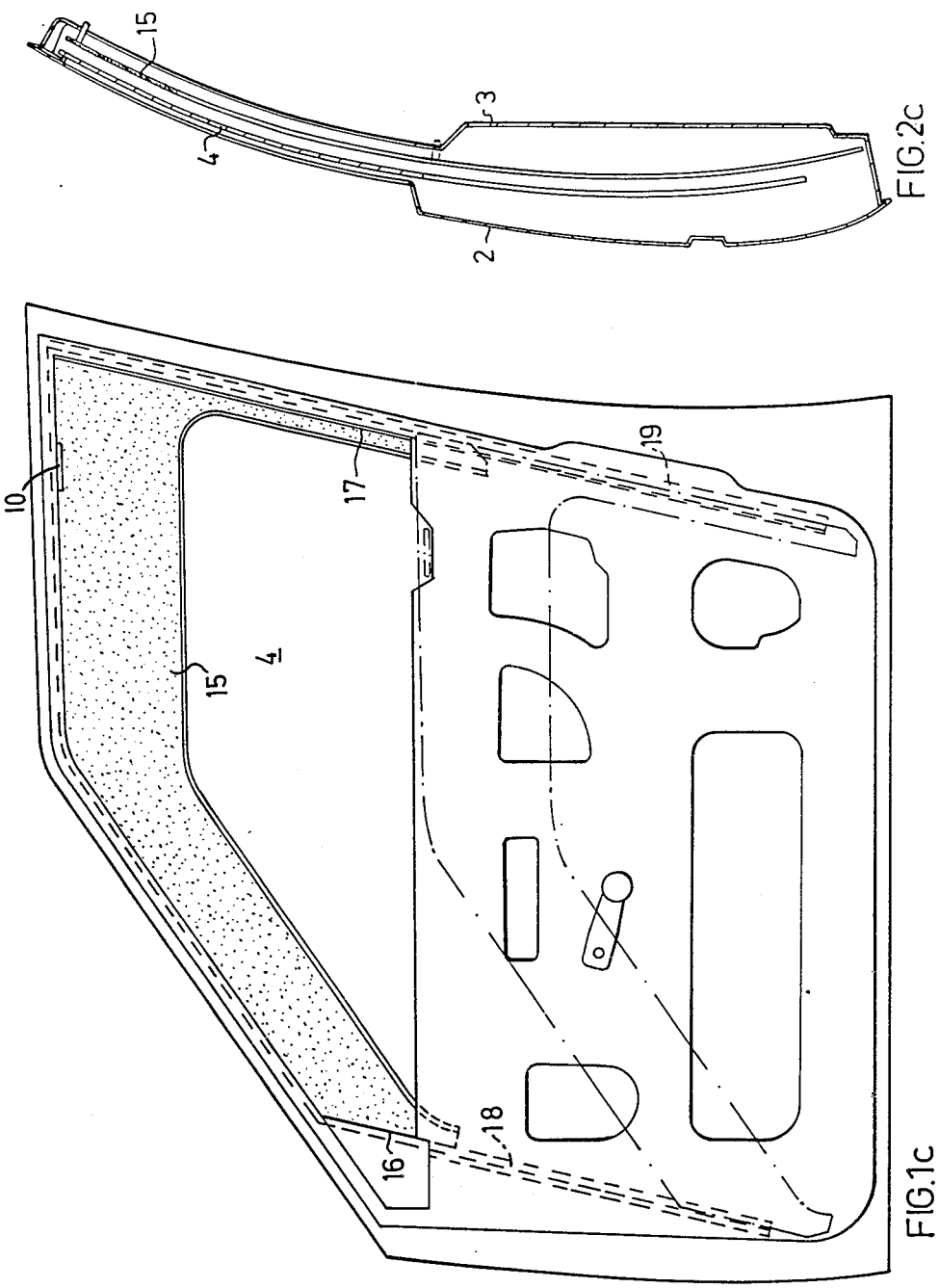

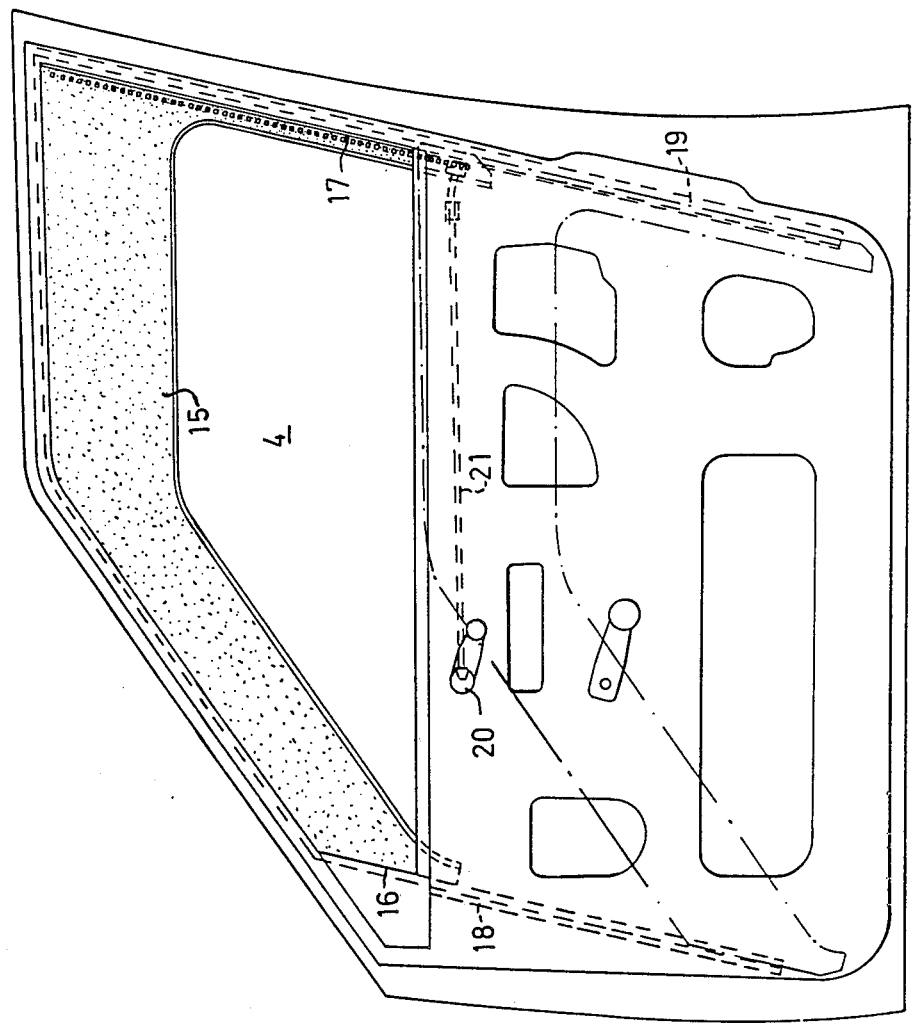

SUN VISOR FOR THE SIDE WINDOWS OF AUTOMOTIVE VEHICLES

The present invention relates to a sun visor for the side windows of automotive vehicles.

The sun visor, or glare shield, which may comprise a rigid plate, a reinforced soft body of, e.g., foam plastic, or a fabric stretched in a carrier frame, is displaceably journalled in guides located in the sides of the vehicle. When the sun visor is not in use, it is lowered vertically adjacent the aforesaid side of the vehicle, in the same manner as the glass of a side window can be wound down, and is there fully hidden from view. When occupying its fully raised position, the sun visor, or glare shield, will cover an upper part of the side window. The sun visor can be raised either fully or partially, so as to provide the amount of shade required by the person served by the visor, this facility not being found with a conventional sun visor that is pivotally journalled in the vicinity of a window support pillar. Such conventional sun visors, or glare shields, can only be caused to cover the upper part of the side window. A further advantage is that a vertically displaceable door-mounted sun visor for vehicle side windows can be maintained in its intended position of use when leaving and entering the vehicle through said door, since the visor will accompany the door as it opens and closes and will therefore not impede exit from or entry into the vehicle through the door. A conventional sun visor, or glare shield, on the other hand, must be swung back against the side window when leaving or entering a vehicle through the door on which the visor is fitted.

The invention will now be described in more detail with reference to an exemplifying embodiment thereof illustrated in the accompanying drawings, in which FIGS. 1a–1d are side views of a vehicle door from which the interior trim has been removed, and illustrate four mutually different embodiments of a sun visor constructed in accordance with the invention fitted to respective doors; and FIGS. 2a–2d are cross-sectional views of the respective doors of FIGS. 1a–1d.

The illustrated door 1 is of conventional fabrication and comprises external and internal door panels 2 and 3 respectively and a side window 4 which is guided for vertical movement in verticle guides located between the panels.

The embodiments illustrated in FIGS. 1a, 1b and 2a, 2b include a sun visor, or glare shield, which consists of a rigid sheet 5 of, e.g. a tinted plastic material. The sheet is connected to two posts 6, 7 which are mounted for vertical movement in guides or runners 8, 9 located in the cavity between the external and internal door panels 2, 3. The shape or configuration of the sheet 5 conforms with the configuration of the upper part of the side window 4. In the case of the illustrated embodiment, the sheet 5 leaves a forwardly located part of the window free so as not to obscure the driver's view of an external rear-view mirror. The sun visor, or sheet, of these embodiments also has a hand-grip 10 located at its upper edge. In order to prevent the sheet from skewing or slanting in the runners 8, 9, in the manner of a "sticking draw", the sheet is connected to a system of cables 11 and pulleys 12. In the embodiment of FIGS. 1b and 2b, the sheet is connected to a hoist mechanism, comprising cables 11, pulleys 12, and a cable drum driven by a crank 13.

The embodiments illustrated in FIGS. 1c, 1d and 2c, 2d, include a sun visor, or glare shield, in the form of a rigid sheet 15 which extends across the whole width of the side window 4. The respective forward and rearward edge portions 16, 17 of the sheet 15 run in vertical guides or runners 18, 19 provided in the door. In the embodiment illustrated in FIGS. 1c and 2c, a handgrip 10 is provided directly on the sun visor, whereas in the embodiment illustrated in FIGS. 1d and 2d the sun visor co-acts with a hoist mechanism 21 operated by a crank 20.

The hoist mechanism is self-braking, and hence the vertical guides may be constructed so as to produce the lowest possible frictional force against the edges of the sun visor in the case of the embodiments illustrated in FIGS. 1b, 1d and 2b, 2d, whereas in the case of the two embodiments illustrated in FIGS. 1a, 1c and 2a, 2c a given amount of friction must be generated in order to hold the sun visor in the position to which it is set.

I claim:

1. In a sun visor for automotive vehicles, comprising a substantially planar body, e.g. a rigid sheet or a fabric sheet stretched in a stiffening frame, characterized in that the body is journalled for vertical up and down movement in guides provided in a vehicle side in the closed proximity of a side window; and in that the body is formed in a manner to cover at least a part of the upper half of the side window when the body is fully raised; the improvement in which the body is journalled in a manner which enables the body to be adjusted to any selected position between a lowered position, in which the body is fully hidden within said side of the vehicle, and a raised position in which it covers an upper part of the side window but exposes a lower part of the window.

2. A sun visor according to claim 1, characterized in that the width of the body is smaller than the width of the side window.

3. A sun visor according to claim 1, characterized in that the width of the body is substantially equal to the width of the side window.

4. A sun visor according to claim 1, characterized in that the body is connected to a hoist mechanism arranged in said side of the vehicle.

5. A sun visor according to claim 1, characterized in that the body is provided with a handgrip and is connected to a mechanism which prevents skewing or slanting of the body in said guides.

* * * * *